United States Patent [19]

Wolff

[11] Patent Number: 4,718,535

[45] Date of Patent: Jan. 12, 1988

[54] METHOD AND APPARATUS FOR THE REARRANGING OF BAKERY ARTICLES

[75] Inventor: Manfred Wolff, Weinstadt, Fed. Rep. of Germany

[73] Assignee: Werner & Pfleiderer GmbH, Stuttgart, Fed. Rep. of Germany

[21] Appl. No.: 3,125

[22] Filed: Jan. 14, 1987

[30] Foreign Application Priority Data

Jan. 23, 1986 [DE] Fed. Rep. of Germany ....... 3601904

[51] Int. Cl.$^4$ .............................................. B65G 47/26
[52] U.S. Cl. .................................... 198/424; 198/428; 198/432
[58] Field of Search ............... 198/432, 428, 427, 433, 198/424; 414/72, 73, 74, 75, 737, 744 B, 744 C, 752

[56] References Cited

U.S. PATENT DOCUMENTS

| | | | |
|---|---|---|---|
| 3,805,943 | 4/1974 | Warren | 198/428 X |
| 4,199,050 | 4/1980 | Moller | 198/432 X |
| 4,411,574 | 10/1983 | Riley | 198/432 X |
| 4,442,657 | 4/1984 | Busseniers et al. | 414/73 X |

FOREIGN PATENT DOCUMENTS

| | | | |
|---|---|---|---|
| 2214637 | 10/1973 | Fed. Rep. of Germany | 414/72 |
| 2062577 | 5/1981 | United Kingdom | 414/744 B |

*Primary Examiner*—Robert J. Spar
*Assistant Examiner*—Cheryl Lynn Gastineau
*Attorney, Agent, or Firm*—Roberts, Spiecens & Cohen

[57] ABSTRACT

A method and apparatus for rearranging a plurality of baking articles which are transported in successive transverse rows on a first conveyor onto a second conveyor extending at an angle to the first conveyor in which successive transverse rows of the articles are lifted from the first conveyor by suction cups on an endless suction belt and conveyed above the second conveyor where the transverse rows of articles form longitudinal rows above the second conveyor. The suction applied to the articles is interrupted when the articles are positioned above the second conveyor so that the articles are deposited onto the second conveyor and are transported thereby so that the articles previously arranged in the transverse rows on the first conveyor are transported in longitudinal rows on the second conveyor.

16 Claims, 7 Drawing Figures

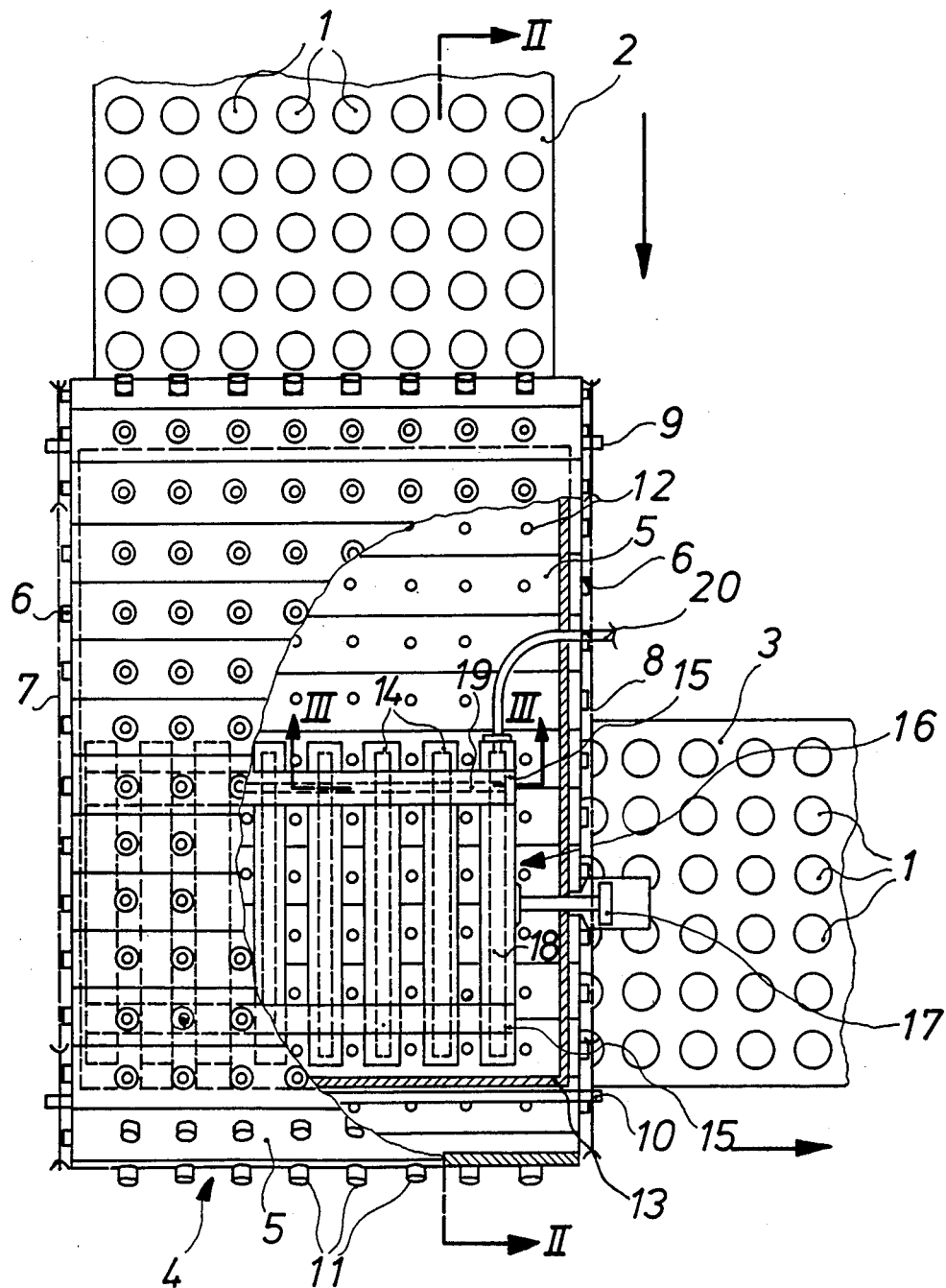

METHOD AND APPARATUS FOR THE REARRANGING OF BAKERY ARTICLES

FIELD OF THE INVENTION

The present invention relates to a method and apparatus for rearranging baked goods, such as cookies from transverse rows on one conveyor to longitudinal rows on a second conveyor extending transversely to the front conveyor.

BACKGROUND

In continuously operating systems for the production of bakery articles, such as cookies, the bakery articles are conveyed from their production station (which may include a pastry cutting machine, a pastry shaping machine, an extruder, a decorating device and the like) in a plurality of precisely arranged longitudinal rows through an oven to automatically operating packing machines. The bakery articles are fed in columns to the packaging machines from the individual longitudinal rows, and the same number of bakery articles are taken from each column and formed into respective packages. It frequently happens that the weights of the bakery articles in different longitudinal rows differ from each other, for example, because the bakery articles in the side regions of the continuous oven are baked more thoroughly than the others. Deviations in weight can, however, also be produced during production of the bakery articles in the cutting or molding operations. For example, the strip of dough ready for cutting may have differences in weight in the transverse direction due, for example, to mechanical sagging of the dough-strip shaping rollers, or to specific changes in the amount of dough on the lateral hopper walls of dough-strip rollers, or to a thickening of the dough on the sides of the strip of dough or to inadequate flow of the dough on the side walls of the hopper. Finally, non-uniformity of the bakery articles may be due to a different distribution of additives to the dough such as, for instance, nuts, bits of chocolate or the like. Because there may be different weights of the bakery articles in different longitudinal rows, packages can be produced at the outlet of the packaging machines of greatly different weight and/or different package lengths for the same number of bakery articles in each package. Since the weights of the packages must not be less than a minimum weight (according to the law of many jurisdictions) it has been the practice, to form each package with greater overweight than would be necessary based on the average weight of the bakery articles.

In order to overcome this disadvantage, it is known to mix the bakery articles by rearranging them. For this purpose, in a device disclosed in DE-OS No. 33 38 068, a first conveyor is provided which, at a transfer edge, transfers the bakery articles to a second conveyor which has transport channels arranged transverse to the direction of conveyance of the first conveyor. In this arrangement, the bakery articles present in transverse rows on the first conveyor form longitudinal rows in the transport channels of the second conveyor. If, from the longitudinal rows of the second conveyor columns of the baked articles are supplied to packaging machines, then each column contains bakery articles from all longitudinal rows of the first conveyor. As a result, any differences in the weights of the bakery articles within a package are substantially balanced.

The transfer of the bakery articles from the first conveyor to the second conveyor is effected, in the known apparatus, by moving the transfer edge of the first conveyor transversely back and forth over the second conveyor. As soon as the bakery articles on the first conveyor reach the transfer edge they drop with a tilting movement onto the second conveyor. Here there is not only the danger that an edge of the bakery articles may strike against the second conveyor and thereby be damaged, but they may even turn over upon the tilting and then lie upside down on the second conveyor which may impair the packing process. The exact arrangement of the bakery articles is considerably disturbed by the tilting movement, which does not always take place simultaneously, for which reason special guides are necessary for realignment on the second conveyor. Due to the high forces of inertia which occur in the drive apparatus upon the backward and forward movement of the transfer edge, there is an upper limit to the speed of transfer. The known apparatus therefore cannot be used in high-capacity systems operating with a large throughtput.

DE-PS No. 503 471 discloses an apparatus in which an endless air pervious belt cooperates with a suction device to lift cookies or the like from a first conveyor and deposit them on a second conveyor which is moved in the same direction as the first conveyor. This known suction conveyor belt permits a simple transfer process in which no intentional rearrangement or mixing of the cookies takes place.

U.S. Pat. No. 3,170,581 discloses a decapsulator in which a conveyor belt provided with suction cups is used to lift loaves of bread from capsules present on a first conveyor and place the loaves on a second conveyor which is moved in the same direction above the first conveyor. Upon this decapsulation neither an ordered rearrangement nor a mixing of the baked articles takes place.

SUMMARY OF THE INVENTION

Proceeding from the mixing of bakery articles by transfer from a first conveyor to a second conveyor arranged transverse to it (as known from DE-OS No. 33 38 068) an object of the present invention is to provide a method and apparatus of the above type which make possible a pre-established, gentle rearrangement of the baked articles at high capacity.

This object is achieved by the method of the invention by lifting successive transverse rows of the articles from the first conveyor by suction and conveying the lifted articles in said transverse rows to a position above the second conveyor where the transverse rows of articles form longitudinal rows above the second conveyor, and interrupting the suction applied to the articles when the articles are positioned above the second conveyor so that said articles are deposited on the second conveyor and are transported thereby so that the articles previously arranged on the transverse rows on the first conveyor are transported in longitudinal rows on the second conveyor.

The apparatus in accordance with the invention comprises a first conveyor on which baking articles are transported in successive transverse rows, a second conveyor extending at an angle to the first conveyor, a third conveyor located above said first and second conveyors and driven in the same direction as said first conveyor, suction means on said third conveyor for lifting successive transverse rows of articles from said first conveyor and conveying said articles by said third conveyor to a position above the second conveyor in which the transverse rows of articles form longitudinal rows, and means for interrupting the suction means when the articles are above the second conveyor so that the articles drop onto the second conveyor and the articles previously arranged in transverse rows on the first conveyor are transported in longitudinal rows on the second conveyor.

In the method and apparatus of the invention, by virtue of the lifting of the bakery articles in transverse rows by suction from the first conveyor, a gentle treatment is assured while retaining the precise order of the bakery articles. The deposit of the bakery articles on the second conveyor takes place, without change in the position of the individual bakery articles, intentionally and in all cases at the same time, so that the exact order of the bakery articles is also retained on the second conveyor.

BRIEF DESCRIPTION OF THE FIGURES OF THE DRAWING

FIG. 1 is a top plan view, partly broken away and in section of an apparatus according to the invention for the transfer of bakery articles such as cookies.

DETAILED DESCRIPTION OF A PREFERRED EMBODIMENT

Figure 2A:
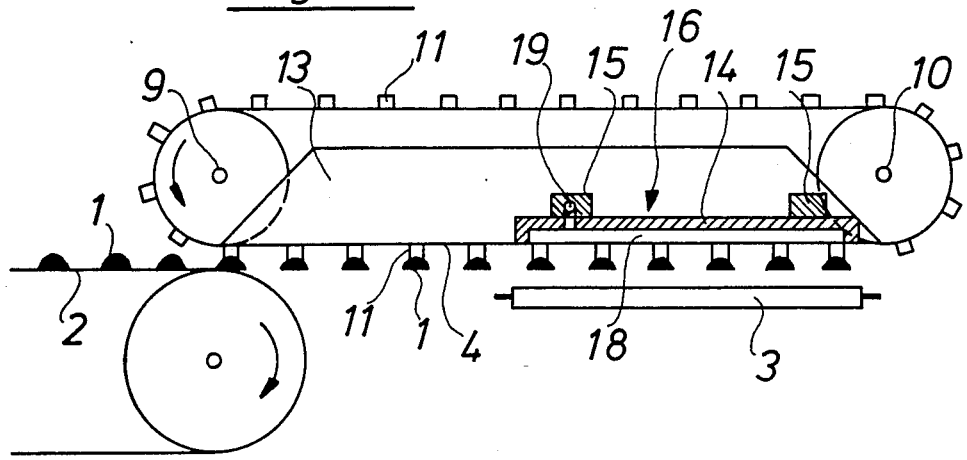
FIGS. 2a-c are greatly simplified longitudinal sections taken along line II—II in FIG. 1, showing the apparatus in different operating positions.

FIG. 1 shows bakery articles 1 such as cookies arranged on a first conveyor 2, which is, for instance, the conveyor belt of an oven (not shown). The cookies 1 are arranged in precisely aligned longitudinal and transverse rows on the first conveyor 2. This precise arrangement of the rows of cookies is obtained during the production of the cookies, which is effected for instance, by cutting a quantity of dough from a strip thereof, and the arrangement is retained up to the end of the oven conveyor belt or of a cooling means which may follow the oven. In the case shown by way of example, the cookies 1 are arranged in eight longitudinal rows on the first conveyor 2.

The cookies 1 on the first conveyor 2 are transferred to a second conveyor 3 which is arranged at right angles to the first conveyor 2. The conveyor surface of the second conveyor 3 is at a lower level than the conveyor surface of the first conveyor. In the embodiment shown, the second conveyor 3 is a conveyor belt which conveys the cookies 1 to one or more packaging machines (not shown). In order for the cookies 1 to be properly fed to the packaging machines they must be aligned precisely in longitudinal and transverse rows on the second conveyor 3. As can be seen in FIG. 1, the cookies 1 are arranged in six longitudinal rows on the second conveyor 3.

The apparatus for transferring the cookies 1 from the conveyor 2 to the conveyor 3 comprises an endless suction conveyor belt 4 which is arranged above both conveyors 2, 3 and extends over the entire width of the second conveyor 3. The suction conveyor belt 4 is constructed as a plate conveyor which comprises a plurality of plates extending transversely to the direction of conveyance with their side edges tightly abutting against each other. In order to improve the tightness, the side edges of the plates 5 can be provided with longitudinally extending shoulders (not shown) which overlap each other. The plates 5 are fastened by holders 6 at their ends to the side plates of sprocket chains 7 and 8 arranged at both sides of the suction conveyor belt 4 and shown in chain dotted outline. The sprocket chains extend over sprocket wheels mounted on the shafts 9, 10 and one of the sprocket wheels is connected to a drive (not shown). In order not to complicate the drawings, a frame which supports the shafts has not been shown. Also not shown is an automatic device for moving the entire transfer apparatus, in case of any possible misalignment with the longitudinal rows of cookies on the first conveyor 2 due to lateral run off of the oven belt.

On each of the plates 5 there is a row of outwardly projecting suction cups 11, the number and position of which correspond to the number and arrangement of the cookies 1 in a transverse row on the first conveyor 2. The interior of each suction cup 11 is in communication with an opening 12 through the plate 5. Concealed within the suction conveyor belt 4 there is a suction chamber 13 having an opening which extends over substantially the entire surface of the lower run of the suction conveyor belt 4. A suction motor (not shown) produces a suction within chamber 13 necessary for the operation of the suction conveyor belt 4.

Disposed within the suction chamber 13, along a section located above the second conveyor 3, is a means for temporarily interrupting the suction in the suction cups 11. This means consists of a number of longitudinal bars 14 corresponding to the number of longitudinal rows of suction cups 11 (eight in the embodiment shown), the bars 14 being conntected together by two transverse beams 15 to form a grate 16. The grate 16 is displaceable transverse to the direction of movement of the suction conveyor belt 4 by a pneumatically actuatable piston-cylinder arrangement 17. The longitudinal bars 14 extend in the direction of conveyance above the lower run of the suction conveyor belt 4. The bars 14 have a width and spacing which are greater than the width of the openings 12 in the plates 5. At their lower surfaces which rest on the plates 5, each of the longitudinal bars 14 has a longitudinal groove 18. The grooves 18 of the bars 14 are connected to each other by a channel system 19 contained in a transverse beam 15 and are in communication via a conduit 20 with a source of a pressure fluid, such as compressed air (not shown).

Figure 2B:
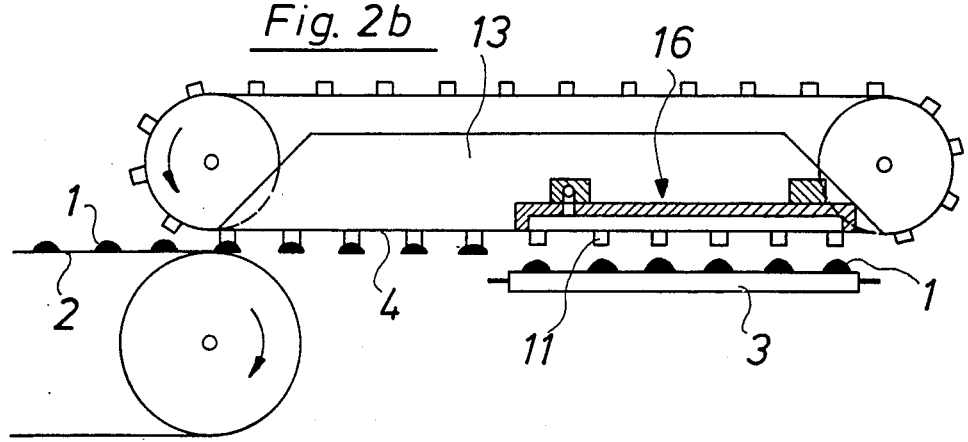
Figure 2C:
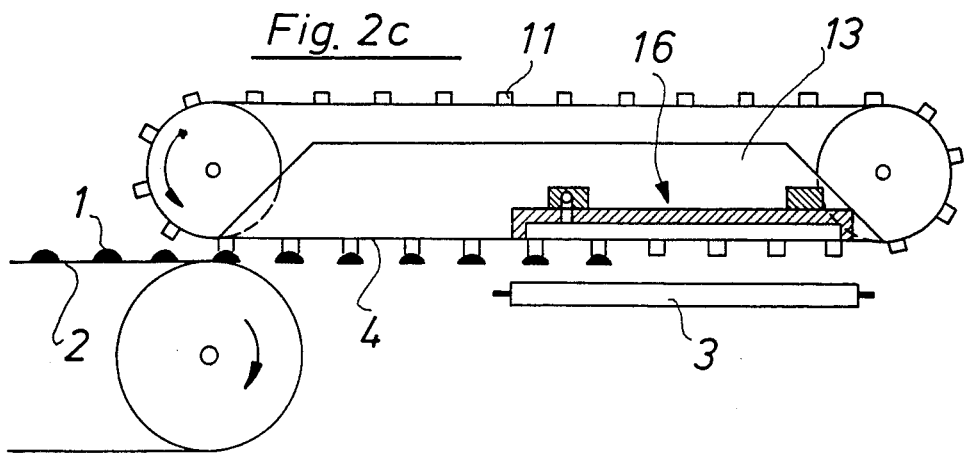

The operation of the apparatus described above is shown in FIGS. 2a-c. The cookies 1 which are present in each case in one transverse row on the conveyor 2 are lifted from the surface of the conveyor 2 by the suction cups 11 of the suction conveyor belt 4 and moved by conveyer 4 in the same direction and at the same speed as the conveyor 2. In order that the suction cups 11, which are provided in the same arrangement as the cookies 1, always come into contact with a cookie, an electronic synchronous control (not shown) having a sensor which senses the cookies on the conveyor 2 is provided, the electronic synchronous control assuring that the speed of the suction conveyor belt 4 always corresponds to the speed of the conveyor 2. The cookies 1, which adhere to the suction cups 11 of the suction conveyor belt 4, are transported by the movement of the suction conveyor belt 4 above the second conveyor 3 (FIG. 2a). As soon as the desired number of transverse rows of cookies is located above the conveyor 3, the suction action is interrupted briefly in this region of the suction conveyor belt 4 and pressure fluid is optionally supplied to the suction cups 11. In this way, the cookies in all the transverse rows present above the conveyor 3 are deposited simultaneously onto conveyor 3. In this regard, the cookies 1 are transferred to the second conveyor 3 in exactly the same arrangement in which they were lifted from the first conveyor 2 (FIG. 2b). Since the action of the suction air is interrupted only for a very short period of time, the transport of further transverse rows of cookies above the second conveyor 3 can take place without interruption (FIG. 2c). After the deposit of the cookies on the second conveyor 3, the cookies 1 are transported on the second conveyor 3 at right angles to their previous direction of conveyance. The cookies 1 which were previously present in transverse rows on the first conveyor 2 now form longitudinal rows on the second conveyor 3. In this way, the desired mixing or rearrangement of the cookies is produced.

Figure 3A:
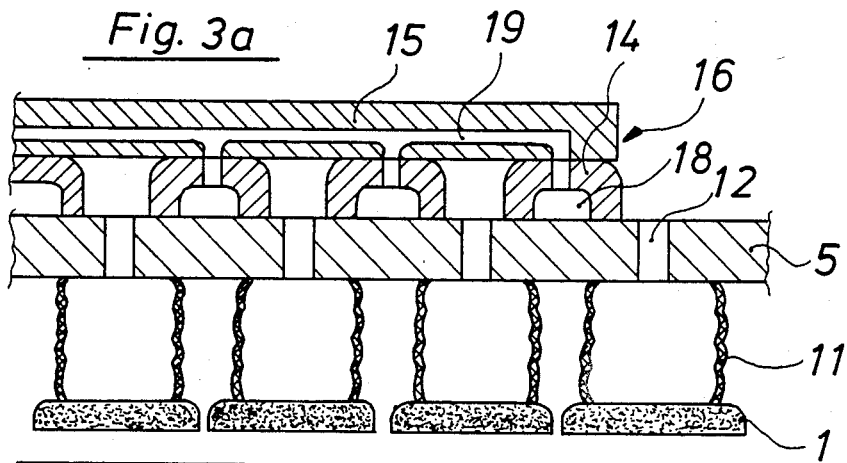
FIGS. 3a-c are enlarged fragmentary sectional views taken along line III—III in FIG. 1 for different operating positions of individual parts of the apparatus.
Figure 3B:
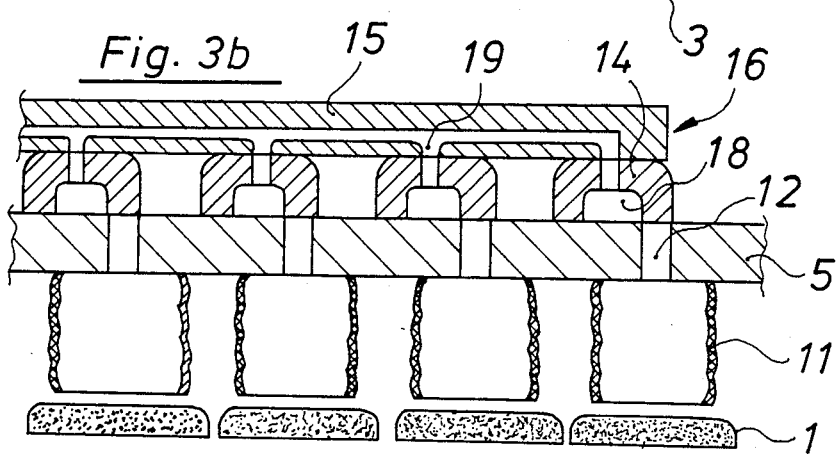
Figure 3C:
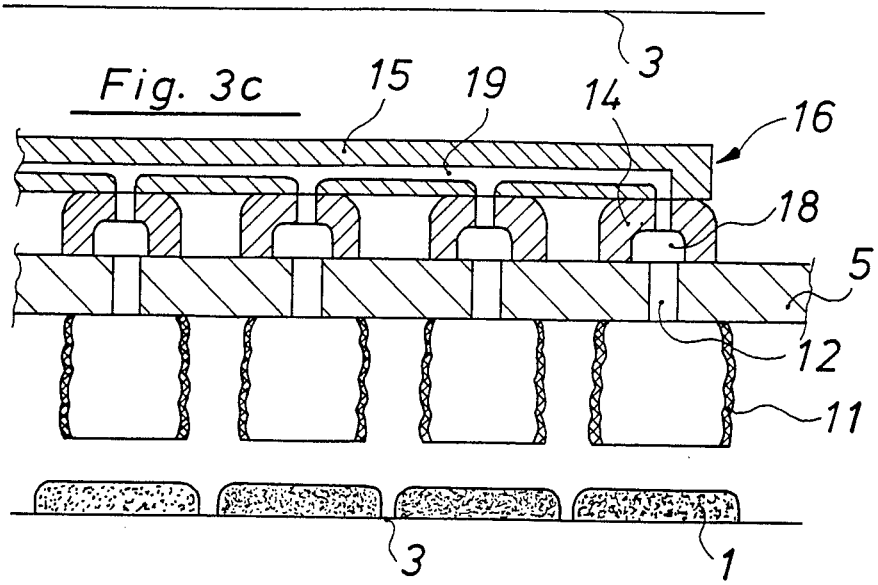

FIGS. 3a–c show how the temporary interruption of the suction action is effected. The position of rest of the grate 16 is shown in FIG. 3a. In this position, the longitudinal bars 14 are located on the upper surfaces of the plates 5 between two adjacent openings 12 whereby suction air can act unimpeded in the suction cups 11 and hold the cookies 1 securely to the cups. Upon a displacement of the grate 16 transverse to the direction of conveyance of the suction conveyor belt 4 by the piston-cylinder arrangement 17 (FIG. 1), the longitudinal bars 14 close the openings 12, as a result of which the action of the suction air on the suction cups 11 is interrupted (FIG. 3b). The cookies 1 accordingly become detached from the suction cups 11 and start their depositing movement onto conveyor 3. If the grate 16 is moved still further to the right as shown in FIG. 3c, the grooves 18 in the bottom of the longitudinal bars 14 communicate with the openings 12 (FIG. 3c) and compressed air can now pass through the channel system 19 in the transverse beam 15 into the suction cups 11. The action of the pressure fluid assures the immediate separation of the cookies 1 from the suction cups 11 and accelerates the deposit of the cookies onto the second conveyor 3. In this way, delays in depositing the cookies which could interfere with the arrangement of the cookies on conveyor 3 are positively prevented. Immediately upon reaching the position shown in FIG. 3c, the grate 16 moves to the left to its rest position, shown in FIG. 3a, so that the action of the compressed air is restricted to the generation of a short puff of air.

The signal for the displacement of the grate 16 is produced by an electronic control (not shown) which acts on the piston-cylinder arrangement 17. By a suitable adjustment of the control it is possible to vary the number of transverse rows of cookies 1 to be placed on the second conveyor 3, within the maximum established by the width of the conveyor 3, and to form a different number of longitudinal rows of cookies, as required, on the second conveyor 3.

Although the invention has been described in relation to a specific embodiment thereof, it will become apparent to those skilled in the art that numerous modifications and variations can be made within the scope and spirit of the invention as defined in the attached claims.

What is claimed is:

1. A method of rearranging a plurality of baking articles which are transported in successive transverse rows on a first conveyor onto a second conveyor extending at an angle to the first conveyor, said method comprising lifting a plurality of successive transverse rows of the articles from the first conveyor by suction and conveying the lifted articles in said transverse rows to a position above the second conveyor where the transverse rows of articles form longitudinal rows above the second conveyor, reducing the suction applied to the lifted articles in said plurality of transverse rows when said articles are positioned above the second conveyor so that said articles are simultaneously deposited on the second conveyor and transported thereby so that the articles previously arranged in the transverse rows on the first conveyor are transported in longitudinal rows on the second conveyor, wherein the first and second conveyors travel continuously and the articles are transported between the first and second conveyors by a third conveyor which is operated continuously.

2. A method as claimed in claim 1 wherein the suction force is interrupted when the articles are deposited onto the second conveyor.

3. A method as claimed in claim 2 wherein the second conveyor is driven transversely of the first conveyor.

4. A method as claimed in claim 1 wherein the articles lifted from the first conveyor are transported to the second conveyor and simultaneously deposited thereon.

5. A method as claimed in claim 1 comprising blowing air on said articles to deposit the articles onto the second conveyor.

6. A method as claimed in claim 1 wherein the lifted articles are transported from the first conveyor to the second conveyor with the same orientation that the articles occupied on the first conveyor and at the same speed as said first conveyor.

7. Apparatus for rearranging baking articles comprising a first conveyor on which baking articles are transported in successive transverse rows, a second conveyor extending at an angle to the first conveyor, a third conveyor located above said first and second conveyors and driven in the same direction as said first conveyor, suction means on said third conveyor for lifting a plurality of successive transverse rows of articles from said first conveyor and conveying said articles by said third conveyor to a position above the second conveyor in which the transverse rows of articles form longitudinal rows, and means for interrupting the suction means when the articles in said plurality of successive transverse rows are above the second conveyor so that the articles simultaneously drop on to the second conveyor and the articles previously arranged in transverse rows on the first conveyor are transported in longitudinal rows on the second conveyor, wherein said first and third conveyors are driven continuously.

8. Apparatus as claimed in claim 7 wherein said third conveyor comprises an endless belt which overlaps the first conveyor and passes over the entire width of the second conveyor.

9. Apparatus as claimed in claim 8 wherein said suction means comprises a suction chamber within said third conveyor, said means for interrupting the suction means comprising a grate means within said suction chamber to interrupt the suction in the third conveyor over a portion thereof located above said second conveyor.

10. Apparatus as claimed in claim 9 wherein said endless belt has openings therein communicating with said suction chamber, said suction means further comprising suction cups on said belt communicating with said openings.

11. Apparatus as claimed in claim 10 wherein said grate means comprises a plurality of bars, one for each longitudinal row on said first conveyor, each bar being displaceable transversely of the third conveyor, and means on each bar for blocking communicating between said openings in said endless belt and said suction chamber in one position of said bar while providing such communication in a second position of said bar.

12. Apparatus as claimed in claim 11 comprising means for supplying pressure fluid to said openings when said bars are in said one position.

13. Apparatus as claimed in claim 11 wherein each bar has a groove which communicates with a row of openings in said endless belt in said one position while said bar straddles said row of openings, said bars in said second position being located between adjacent row of openings.

14. Apparatus as claimed in claim 13 wherein in a third intermediate position of said bars between said one position and said second position, said bars close said openings in the endless belt.

15. Apparatus as claimed in claim 14 comprising a channel for supply of pressure fluid in communication with said grooves in said bars.

16. Apparatus as claimed in claim 7 wherein said second conveyor is perpendicular to said first conveyor.

* * * * *